W. P. POWERS.
REGULATOR.
APPLICATION FILED APR. 10, 1920.

1,430,113.

Patented Sept. 26, 1922.
2 SHEETS—SHEET 1.

W. P. POWERS.
REGULATOR.
APPLICATION FILED APR. 10, 1920.
1,430,113.
Patented Sept. 26, 1922.
2 SHEETS—SHEET 2.
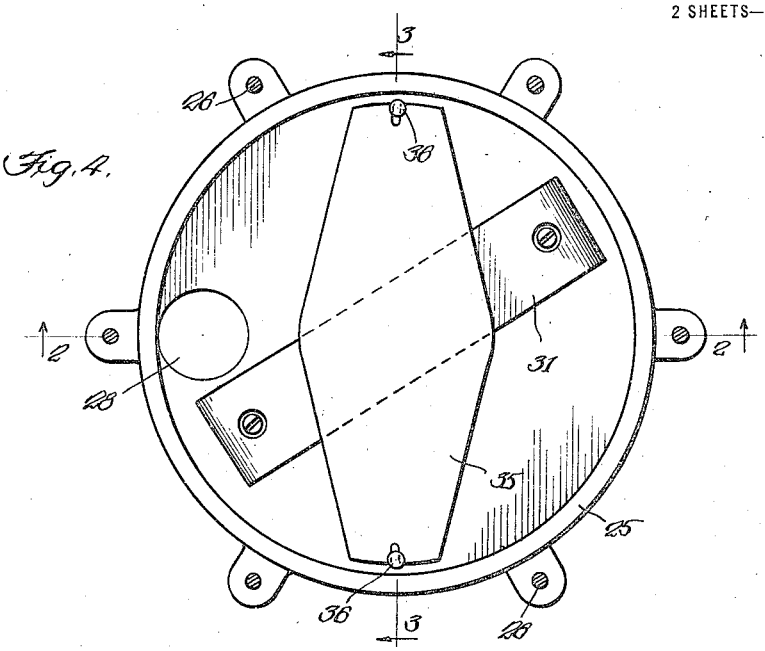
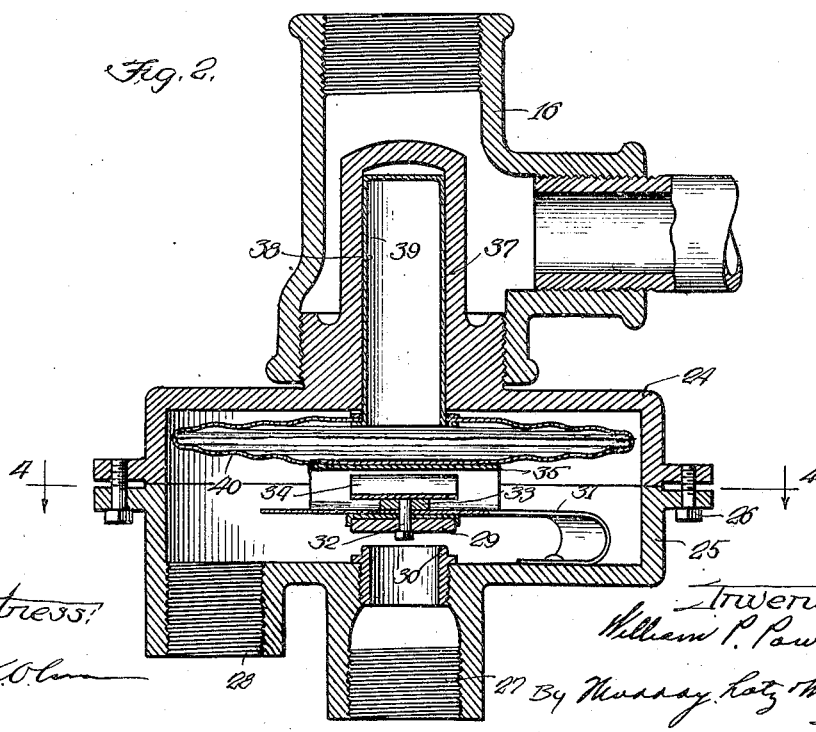

Patented Sept. 26, 1922.

1,430,113

UNITED STATES PATENT OFFICE.

WILLIAM P. POWERS, OF LOS ANGELES, CALIFORNIA.

REGULATOR.

Application filed April 10, 1920. Serial No. 372,397.

*To all whom it may concern:*

Be it known that I, WILLIAM P. POWERS, a citizen of the United States, and resident of Los Angeles, in the county of Los Angeles and State of California, have invented certain new and useful Improvements in a Regulator, of which the following is a specification.

My invention relates to thermostatic controlling devices and particularly to a novel unitary controller adapted for gas heated water storage systems.

One of the principal objects of this invention is to provide a simple unitary device adapted for the control of the supply of gas for heating water or other liquids. In this construction I provide means whereby the thermostatic element consists of a connected rigid tube and a diaphragm, the tube being mounted vertically within a socket or recess located in the path of movement of a body of the liquid. The diaphragm is located outside of the area under the direct action of the heated liquid. This secures several advantages, one of the most important of which is that the thermostat is differential in its operation; that is, as the thermo-sensitive liquid becomes volatilized the quantity thereof is lessened and therefore the amount subjected to the direct heat of the liquid is correspondingly lessened. In view of the method of mounting the thermostatic element with the rigid tube in a vertical position and the diaphragm beneath the same, the diaphragm is always filled with the liquid whereas the amount within the tube varies in acordance with the heating conditions.

A further advantage is that a thermostatic element so constructed and mounted may readily be removed for inspection or renewal without interference with the casing within which it is placed.

The invention will be better understood by reference to the accompanying drawing, wherein, Fig. 1 is a longitudinal vertical section through a water heating appliance constructed in accordance with my invention;

Fig. 2 is an enlarged vertical section through the thermostatic heat-regulating element;

Fig. 4 is a sectional view on the line 4—4 of Fig. 2.

Figure 1:
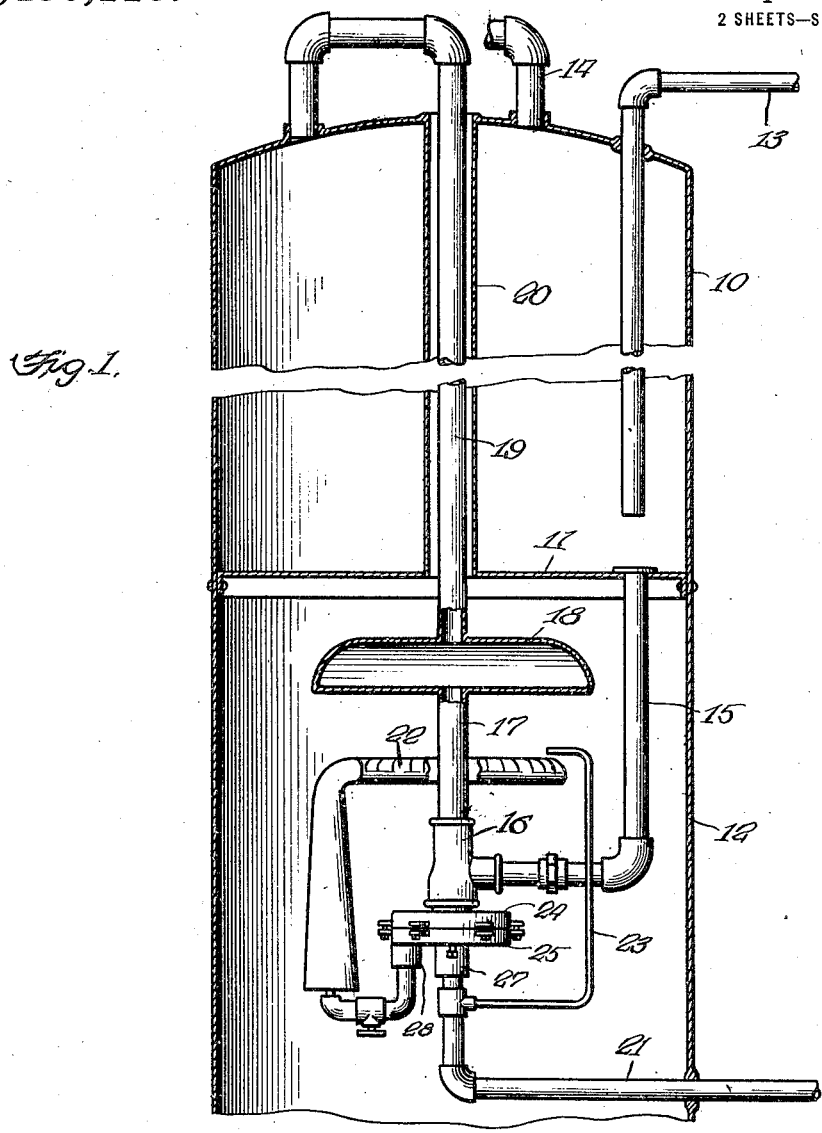

In the assembly shown in Fig. 1, and which may be of any approved form, I provide a tank 10 having a bottom wall 11 and a skirt 12 within which the heating and regulating appliances are mounted. Water is supplied through a pipe 13 and discharged through a pipe 14. A pipe 15 communicates with the lower portion of the tank 10 and is in communication with a T 16, a pipe 17 containing a flame spreader 18 being connected with one branch of the T. A pipe 19 is connected to the spreader and passes upwardly through a central ventilating duct 20 and is connected to the top of the tank 10 completing with pipe 15 and the tank a circulating system.

The gas is supplied through a pipe 21 and is directed through the regulator to a burner 22 mounted beneath the flame spreader, a by-pass 23 providing a pilot light in the usual manner.

Figure 3:
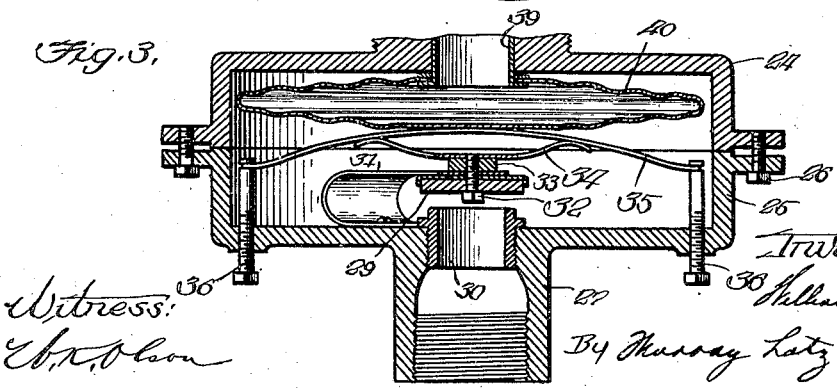
Fig. 3 is a sectional view taken at right angles to that of Figure 2.

The regulating unit, best shown in Figs. 2 and 3, comprises a casing composed of two parts 24, 25, joined by means of bolts 26. The lower part provides for pipe connections at 27, 28 for the gas supply, the passage of gas from the supply to the burner being controlled by a valve 29 which may be composed of leather or brass and is adapted to be seated on the removable seat member 30. The valve 29 is secured to a flat spring 31, the ends of which are rebent and secured to the casing. This spring is of sufficient strength to retain the valve away from its seat under normal conditions. A bolt 32 serves the purpose of joining the valve member 29, the spring 31, a spacing disc 33 and a short relief spring 34. The latter bears at its ends against a regulating spring 35, the respective ends of which engage adjusting screws 36, the heads of which are located exteriorly of the casing.

The upper portion 24 of the casing is constructed to provide a threaded hollow boss or tube 37, the threaded portion of which is adapted to engage with the T 16, the tubular portion projecting axially into the passage within the T or casing 16, the upper end of the tube being closed. The lower end of the recess 38 within the tubular projection is open and the recess is shaped to accommodate a rigid container 39 also in the form of a tube, which constitutes a part of the thermostatic element 40 which is in the form of double diaphragms, the space between which is in communication with the tube or container 39. A thermostatic liquid which vaporizes or volatilizes at the requisite temperature is confined within the thermostatic element.

In operation the water which circulates through the pipes which constitute the system is caused to pass in contact with the tube 37 which contains the thermostatic tube 39 and the temperature of the liquid is transmitted to the thermostat. As the temperature rises a portion of the thermostatic liquid vaporizes and the diaphragm 40 is caused to expand thereby overcoming the force exerted by the springs 35, 31 and moving the valve 29 towards its seat, thus serving to restrict or entirely shut off the supply of gas to the burner. The relief spring 34 is of such strength that it is normally unaffected by the movement of the diaphragm but in the event of excesive pressure within the diaphragm it permits the expansion thereof after the valve 29 has been seated. The resistance offered by the springs may be regulated by means of the screws 36.

It will be seen that the thermostatic element is so arranged that it may readily be inserted or removed, it being only necessary to disengage the lower portion 25 of the casing; and the simplicity and compactness of the device make it desirable and useful as will readily be appreciated by those familiar with such constructions. The arrangement of the thermostat in a vertical position provides for a differential control, in that as the thermostatic liquid is vaporized the quantity thereof is reduced and the area exposed to the heat is lessened. The walls of the tubular member 37 will be relatively thin and heat will be quickly transmitted by conduction to the rigid container 39.

Obviously the construction is capable of considerable modification and I do not wish to be limited except as indicated in the appended claims.

I claim:

1. In a regulator, the combination of a casing having a passage for water, a thermostatic element having a portion projecting into said passage, said element including a flexible end wall in the form of a diaphragm, a second casing having gas inlet and outlet openings and providing a space within which the flexible wall of said thermostatic element is located, a valve adapted to cooperate with one of said openings, a resilient valve-carrying member adapted normally to maintain the valve away from its seat, and adjustable spring means interposed between said resilient valve-carrying member and said thermostatic element.

2. In a regulator, the combination of a casing having a passage for water, a thermostatic element having a portion projecting into said passage, said element including a flexible end wall in the form of a diaphragm, a second casing having gas inlet and outlet openings and providing a space within which the flexible wall of said thermostatic element is located, a valve adapted to cooperate with one of said openings, a resilient valve-carrying member adapted normally to maintain the valve away from its seat, a leaf spring interposed between the thermostatic element and said valve-carrying member, and means engaging an end of said leaf spring for adjusting the same.

3. In a regulating device, the combination of means providing a passage for heated water, a thermostatic element having a portion located in position to be affected by the temperature of the water, said thermostatic element including a diaphragm, a casing having inlet and outlet passages for a water heating medium, said thermostatic element being located within said casing, a valve overlying one of said openings, a leaf spring on which said valve is mounted, said spring being adapted to maintain the valve away from its seat, and spring means interposed between the thermostatic diaphragm and said valve member.

Signed at Los Angeles, this eighteenth day of February, 1920.

WILLIAM P. POWERS.

Witness:
HAL COCKRAN.